(12) United States Patent
McClelland (10) Patent No.: US 9,764,938 B2
(45) Date of Patent: Sep. 19, 2017

(54) HEATING SYSTEM FOR A UREA DISPENSER

(71) Applicant: TOKHEIM HOLDING B.V., Bladel (NL)

(72) Inventor: David McClelland, Carnoustie Angus (GB)

(73) Assignee: Tokheim Holding B.V., Downers Grove, IL (US)

( * ) Notice: Subject to any disclaimer, the term of this patent is extended or adjusted under 35 U.S.C. 154(b) by 0 days.

(21) Appl. No.: 15/032,904

(22) PCT Filed: Oct. 16, 2014

(86) PCT No.: PCT/FR2014/052637
§ 371 (c)(1),
(2) Date: Apr. 28, 2016

(87) PCT Pub. No.: WO2015/063387
PCT Pub. Date: May 7, 2015

(65) Prior Publication Data
US 2016/0280532 A1    Sep. 29, 2016

(51) Int. Cl.
*B67D 7/82* (2010.01)
*B67D 7/54* (2010.01)
(Continued)

(52) U.S. Cl.
CPC ............ *B67D 7/54* (2013.01); *B67D 7/02* (2013.01); *B67D 7/0288* (2013.01); *B67D 7/82* (2013.01); *F16L 53/002* (2013.01)

(58) Field of Classification Search
CPC ........ F16L 53/002; F16L 53/008; B67D 7/82; B67D 7/80
(Continued)

(56) References Cited

U.S. PATENT DOCUMENTS 9,057,308 B2 * 6/2015 Larsson .................. B67D 7/08
2010/0252571 A1 * 10/2010 Gehman .................. B67D 7/02
222/74
(Continued)

FOREIGN PATENT DOCUMENTS

DE    20 2011 100 991 U1    8/2012
DE    20 2013 006 358 U1    7/2013
(Continued)

OTHER PUBLICATIONS

English Translation of Written Opinion of the International Searching Authority (International Application No. PCT/FR2014/052637) (6 pages) (Date of Mailing form PCT/ISA/210—dated Jan. 29, 2015).

*Primary Examiner* — Timothy L Maust
*Assistant Examiner* — Timothy P Kelly
(74) *Attorney, Agent, or Firm* — Fish & Richardson P.C.

(57) ABSTRACT

The subject of the present invention is a liquid dispenser intended for vehicles and a method implemented during the operation of such a liquid dispenser. The liquid dispenser for a vehicle includes a liquid dispensing circuit (2) connected at one end to a liquid reservoir and at the other end to a flexible hose (3) connected to a gun (4) for dispensing the liquid from a reservoir of the vehicle, the flexible hose (3) having two substantially coaxial ducts (5, 6) including a first duct (5) for transferring the liquid from the liquid dispensing circuit (2) to the gun (4) during the delivery of the liquid from the reservoir of the vehicle, and a second duct (6) extending along the first duct (5). The liquid dispenser includes a heating system (7) intended to generate a flow of hot air through the second duct (6) of the flexible hose (3) so as to heat the liquid inside the first duct (5) of the flexible hose (3).

7 Claims, 8 Drawing Sheets

(51) Int. Cl.
*B67D 7/02* (2010.01)
*F16L 53/00* (2006.01)

(58) Field of Classification Search
USPC .................. 141/82; 222/54; 392/468, 472
See application file for complete search history.

(56) References Cited

U.S. PATENT DOCUMENTS

2012/0305089 A1\* 12/2012 Larsson ............... B67D 7/02
    137/1
2015/0300550 A1\* 10/2015 Shelton ............... B67D 7/82
    392/466

FOREIGN PATENT DOCUMENTS

| WO | WO 2012/103437 A2 | 8/2012 |
|---|---|---|
| WO | WO 2013/159030 A1 | 10/2013 |

\* cited by examiner

FIGURE 1

PRIOR ART

HEATING SYSTEM FOR A UREA DISPENSER

The purpose of this invention is a liquid dispenser designed for vehicles such as diesel engined trucks or automobiles and a protocol implemented when such a liquid dispenser is being used.

More particularly, the invention concerns a dispenser for a urea-based liquid solution in water.

Diesel engined vehicles are often equipped with a supercharged turbo compressor. Adding a turbo compressor to a supercharger in a diesel engine can enhance combustion by increasing the amount of oxygen supplied and therein, considerably increasing the power of the engine.

An addition like this, however, means bringing into the engine, in addition to oxygen, a large amount of nitrogen which is oxidized during combustion. This causes an increased emission of nitrogen oxides NOx, particularly harmful to the environment in engine exhaust gases.

Now that ecology is little by little becoming one of the main concerns of most governments, and to conserve the environment, vehicles, starting with heavy goods vehicles, are required to comply with increasingly demanding anti-pollution standards obliging them to reduce their nitrogen oxide NOx emissions.

For this purpose, it has been proposed to inject an ammonia-based anti-pollution additive into the catalytic converter, conventionally positioned at the outlet of an engine exhaust, to convert the emitted NOx particles into nitrogen and water vapour which are non-polluting components.

This ammonia-based anti-pollution additive acts as a reducer and is stored and implemented as an aqueous urea solution, a non-toxic product, that is neither explosive nor dangerous.

The anti-pollution additive is commonly referred to as AUS32 ("Aqueous Urea Solution") in Europe.

Currently, professionals sell it under the trade name of AdBlue®. This liquid anti-pollution additive consists of an aqueous solution containing 32.5% urea and 67.5% water and is intended for direct injection into the catalytic converter of a vehicle to reduce the NOx nitrogen oxides. The technology is known as SCR ("Selective Catalytic Reduction") that allows the reprocessing of commercial vehicle exhaust gases by converting approximately 85% of the NOx nitrogen oxides into nitrogen and water vapour.

Many diesel engine trucks have a specific tank containing the antipollution additive (AdBlue®) that is associated with a circuit for injecting this additive into the SCR catalytic converter.

To feed these tanks, filing stations are equipped with AUS32 dispensers allowing the specific tank of a vehicle to be filled. These dispensers can be associated in particular with fuel dispensers.

Installations like this have a storage tank containing anti-pollution additive, a dispenser connected to the storage tank by a distribution pipe, and a pump. The dispenser contains metering, calculation and display devices regarding the quantity of this balanced anti-pollution additive, and a flexible pipe.

This flexible pipe has a nozzle at its free end used for transferring a determined volume of anti-pollution additive into the specific tank of a vehicle, in the same way as the process for dispensing fuel.

In general, the anti-pollution additive has a hydraulic compartment in the lower section containing a liquid dispensing circuit and the meter, and an electronic compartment in the upper section containing the computer and the display devices. The transfer of the product from the tank to the meter is either via a pump immersed in the additive storage tank which can be above-grade or underground, or by a suction pump generally installed in the hydraulic compartment.

Despite the aforementioned advantages, this technology does have drawbacks in so far as the urea-based additive begins to crystallize at −7° C. and solidifies at −11° C., possibly causing major problems in cold weather.

Figure 1:
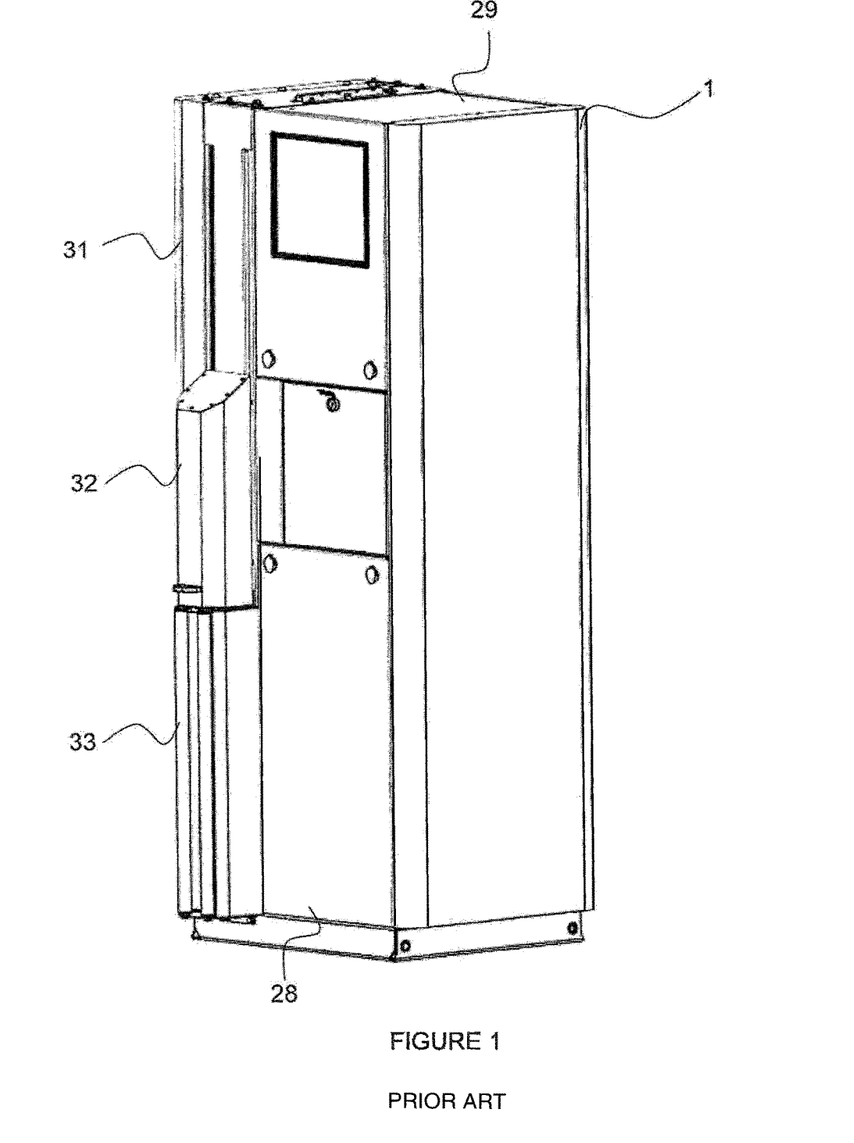
FIG. 1 is a perspective view of an AdBlue® additive dispenser of a prior art.

To remedy this drawback, there are urea-based dispensers, as shown in FIG. 1, for which the dispenser has a storage compartment for the flexible pipe and the dispenser nozzle, closed by a protection door and which has a system for heating the anti-pollution additive on the inside.

However, a dispenser such as this is particularly sophisticated and expensive. When users have finished the additive delivery operation, they do not always shut the door or sometimes vandalize it so that it stays open. The nozzle is then no longer heated.

In addition, to be housed inside the closed compartment of the dispenser, the flexible pipe cannot be more than 5 m long, a possible issue for filling truck tanks which can extend from one side of the truck to the other.

This requires a flexible pipe which is at least 10 m long in order to reach all the way around.

Other known solutions such as that of patent application EP 2 075 218 consisting of using a heated wire inside the flexible pipe to heat the additive it contains.

However, this solution does not allow the nozzle to be heated and also requires an additional radiator inside the hydraulic compartment. In addition, this solution prevents the use of retracting devices such as a spiral reel because the curve radius of a flexible pipe like this is limited. The heating element is fragile and can break.

Other known solutions of patent applications WO 2011/054400 and WO 2012/015685 use a system of liquid circulation in a coaxial flexible pipe containing two pipes one of which is dedicated to a first direction of liquid flow to the nozzle and the other to a second direction of flow opposite to the first, for the return of the liquid. The liquid can flow in a loop thanks to a pump, or return to the liquid tank. This device, in addition to the recirculating pump, requires a device heating the liquid inside the recirculating circuit.

These solutions have the drawback of being complex and costly. The solution of application WO 2012/015685 does not allow the heating of the fluid contained in the nozzle. This means that a complementary solution is necessary. As far as application WO 2011/054400 is concerned, it describes an embodiment in which the liquid passes through the nozzle via one channel and returns to the flexible pipe via another channel and the outlet of the nozzle is plugged by a, plug when the nozzle is hung up on the nozzle support. However, there is a high risk of leakage from the plug.

This invention aims at remedying these drawbacks.

To do this, the invention supplies a liquid dispenser for vehicles and an operating method for such a dispenser which is simpler and less costly than those of the prior art, comprising a heating system for heating both the flexible pipe and the nozzle with a single means of heating.

The invention concerns a liquid dispenser for vehicles that comprises on the one hand a liquid dispensing circuit connected to a liquid tank and to a flexible pipe connected to a nozzle allowing liquid to be dispensed in the tank of a vehicle and on the other hand, the said flexible pipe comprising two conduits, more or less coaxial, of which a first conduit transfers liquid from the liquid dispensing circuit to the nozzle during the delivery of liquid to the tank of the vehicle and a second conduit extends along the first conduit.

According to the invention, the liquid dispenser includes a heating system designed to generate a flow of hot air through the second conduit of the flexible pipe to heat the liquid inside the first conduit of the flexible pipe.

In this way, a simpler and less costly system of heating is obtained than those of the prior art used for the dispensing of AdBlue® and doing away with the need for a sliding door or any other device for isolating the nozzle and the flexible pipe.

The heating system is simpler than the aforementioned systems of the prior art using a fluid recirculating circuit comprising a pump, a heating element and a complementary recirculating circuit connected to the liquid tank. In addition, any risks of leakage are eliminated because the fluid used for heating is hot air. The liquid recirculating systems actually entail risks of the AdBlue® fluid leaking into the recirculating circuit.

According to one particular embodiment of the invention, the nozzle includes:
- a first pipe comprising an inlet connected to the first conduit of the flexible pipe and an outlet via which the liquid is dispensed, and
- a second pipe running along the first pipe of the nozzle and having an inlet connected to the second conduit of the flexible pipe and an outlet opening out upstream of the outlet of the first pipe of the nozzle in order to expel the flow of hot air outside the second pipe of the nozzle.

In this way, the heating system can heat both the flexible pipe and the nozzle in a simple way.

In another particular embodiment of the invention, the liquid dispenser includes a vapour recovery system designed to recover the vapours emitted by the liquid when it is dispensed in the vehicle tank, the said vapour recovery system comprising a vapour recovery circuit connected on the one hand to an intake pump and on the other to the second conduit of the flexible pipe which is connected to the second pipe of the nozzle.

The second conduit of the flexible pipe and the second pipe of the nozzle have a twofold function which is both to allow the circulation of hot air in a first direction of circulation and the circulation of vapours in a second direction of circulation opposite to the first. In this way, a simple heating and vapour recovery system can be obtained comprising a small number of components compared to known systems.

According to another particular embodiment of the invention:
- the heating system includes a means of heating connected to the second conduit of the flexible pipe by means of a hot air circuit and a first valve to close the hot air circuit when the vapour recovery system is active;
- the vapour recovery system includes a second valve for closing the vapour recovery circuit when the heating system is active with the heating system valve open.

This allows each of the circuits to be isolated. When the heating system is active, the second valve is closed in order to isolate the vapour recovery circuit. This is a way of preventing the flow of hot air from circulating through the vapour recovery circuit, avoiding a loss of hot airflow. Similarly, when the vapour recovery system is active, the first valve is closed, avoiding any load loss by drawing it into the hot air circuit. This also ensures that the dispenser is safe. Indeed, for a multi-product dispenser comprising a petrol dispensing module, any fuel vapours drawn into the recovery circuit can rise through the hot air circuit and enter the electronic compartment. This avoids risks of explosion.

In other words, when the vapour recovery system is not being used, the second valve is closed. When the heating system is not being used, the first valve is closed. When the heating system and the vapour recovery system are not being used, both valves are closed.

According to another particular embodiment of the invention, the liquid dispenser comprises a hydraulic compartment housing the liquid dispensing circuit, and an electronic compartment adjacent to the hydraulic compartment and in which the heating means is housed with the hot air circuit extending from the heating means as far as the hydraulic compartment, passing through a vapour-tight wall arranged between the hydraulic and electronic compartments.

In this way, the heating means is in a secure area, tight against vapour, water and dust. There is no need to have a heating means satisfying the ATEX 94/9/CE directives concerning explosive atmospheres, thus reducing the costs.

In another particular embodiment of the invention, the second conduit of the flexible pipe intended for the flow of hot air encloses the first conduit designed for the transfer of the liquid and comprises a hot air inlet with fluidic connection to the heating system, the said second conduit or union connects the flexible pipe to the nozzle comprising a hot air outlet downstream of the nozzle to expel the flow of hot air outside of the flexible pipe.

This allows a conventional nozzle to be used without a second pipe supplying a heating system which is simpler and less costly.

The invention also concerns a method implemented during the operation of a liquid dispenser as defined previously.

This method includes stages consisting in:
- measuring the temperature (T) of the liquid,
- detecting the hanging up of the nozzle on the liquid dispenser after a filling operation and
- if the temperature (T) is less than or equal to the setpoint temperature (TC) ordering the circulation of a hot air flow through the hot air circuit and in the second conduit of the flexible pipe, in a first direction (A) until the nozzle is hung up again According to another particular embodiment of the invention, the liquid dispenser also includes a system recovering the vapours emitted during the filling of a vehicle tank comprising a vapour recovery circuit connected to the second conduit of the flexible pipe and on the other hand, a first valve connected to the hot air circuit allowing this hot air circuit to be closed, as well as a second valve connected to the vapour recovery circuit allowing this vapour recovery circuit to be closed.

The method implemented during the operation of the liquid to dispenser includes steps consisting in:
- detecting the lifting of the nozzle indicating the beginning of a vehicle tank filling operation,
- closing the first valve and opening the second valve to allow
- The recovery of the vapours admitted during this filling operation,
- detecting the hanging up of the nozzle on the liquid dispenser indicating the completion of this filling operation and
- closing the second valve and opening the first valve to allow the ordering of the circulation of a hot air flow through the air circuit if the liquid temperature (T) is less than or equal to the setpoint temperature (TC).

According to another particular embodiment of the invention, the closing of the second valve and the stoppage of the vapour recovery operation, after detecting that the nozzle has been hung up on the liquid to dispenser, take place only after a time delay lasting time t.

This time delay ensures that all the ammonia vapours have been drawn off into the nozzle, the flexible pipe and the air/vapour conduit before the hot air is allowed in.

The advantages offered by the liquid dispenser also apply to the method of implementing this device.

The characteristics of the invention are described in greater detail with reference to the attached illustrations in which.

FIG. 1 represents an AdBlue® dispenser 1 of a prior art including a hydraulic compartment 28 housing a liquid dispensing circuit connected on the one hand to an AdBlue® dispenser and on the other to a flexible pipe itself connected to a nozzle for dispensing the AdBlue® (not shown). Dispenser 1 has an electronic compartment 29 housing the electronic components such as a computer calculating the pulses from a liquid flow meter into a volume, and a display. Dispenser 1 comprises a storage compartment 31 for the flexible pipe and the nozzle. The nozzle is isolated from the outside by a sliding door 32. The storage compartment 31 is closed by a lower isolating component 33 provided with brushes for isolating the storage compartment 31. The hydraulic compartment 28 has a radiator for heating the AdBlue® additive (not shown).

As mentioned previously, this solution of a prior art embodies drawbacks.

Figure 2:
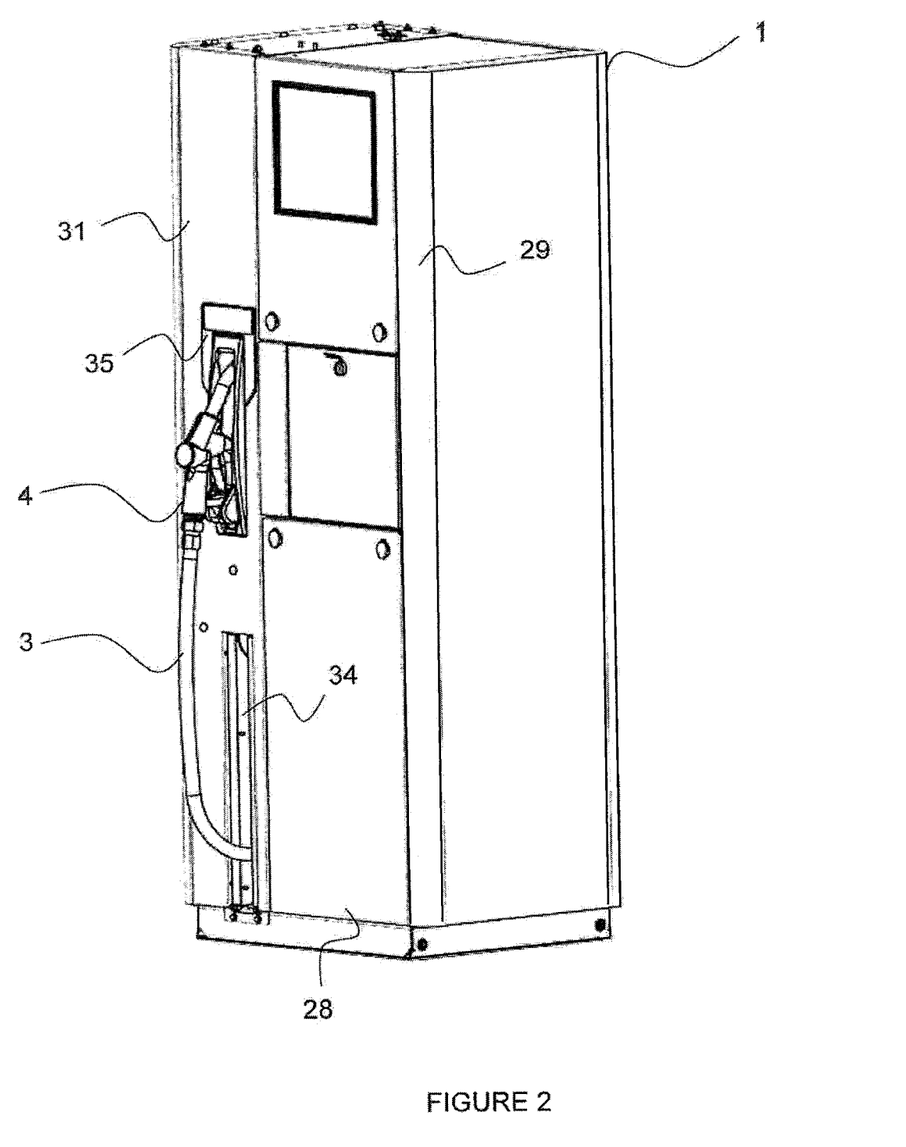
FIG. 2 is a perspective view representing a liquid dispenser according to the invention.
Figure 3:
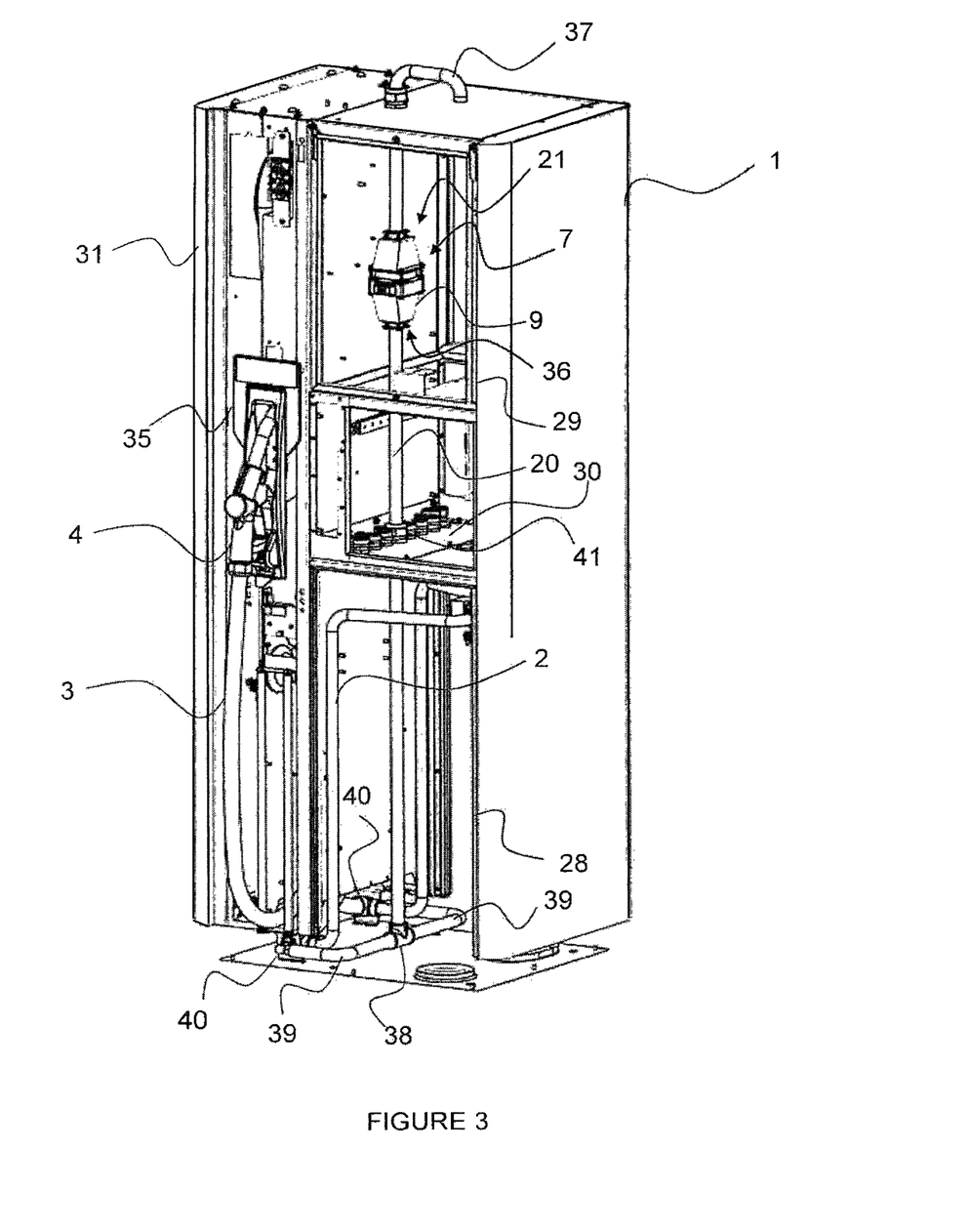
FIG. 3 is a perspective view representing the inside of the liquid dispenser according to one possible embodiment.

FIG. 2 is a perspective view showing a liquid dispenser 1 according to the invention and FIG. 3 is a perspective view showing the inside of liquid dispenser 1. The following embodiments describe, for instance, a liquid dispenser 1 used for dispensing a urea-based liquid such as AdBlue®. The dispenser can also be used for dispensing other urea-based liquids and other liquids having a different composition, such as windscreen washer products liable to freeze at below 0° C.

The liquid dispenser 1 shown is a single product dispenser. The liquid dispenser 1 can also be incorporated into a multi-product dispenser supplying diesel oil and unleaded petrol.

The liquid dispenser 1 in FIGS. 2 and 3 has a hydraulic compartment 28 housing a liquid dispensing circuit 2 connected on the one hand to an AdBlue® tank (not shown) and on the other to a flexible pipe 3 itself connected to a nozzle 4 for dispensing the AdBlue®. The AdBlue® tank can be placed in hydraulic compartment 28 or outside the dispenser.

Liquid dispensing circuit 2 includes a flow meter (not shown) placed inside hydraulic compartment 28 and used for measuring the dispensed liquid volume.

The liquid dispenser 1 includes an electronic compartment 29 housing the electronic components such as a computer converting the pulses of the flow meter into liters, and a display, the liquid dispenser 1 having a storage compartment 31 for the flexible pipe 3 and the nozzle 4. The storage compartment 31 has a slot 34 allowing the flexible pipe 3 to lead out of the hydraulic compartment 28 and a nozzle support 35 on which the nozzle 4 is hung when the operation of dispensing fluid to the vehicle tank is over.

Figure 4:
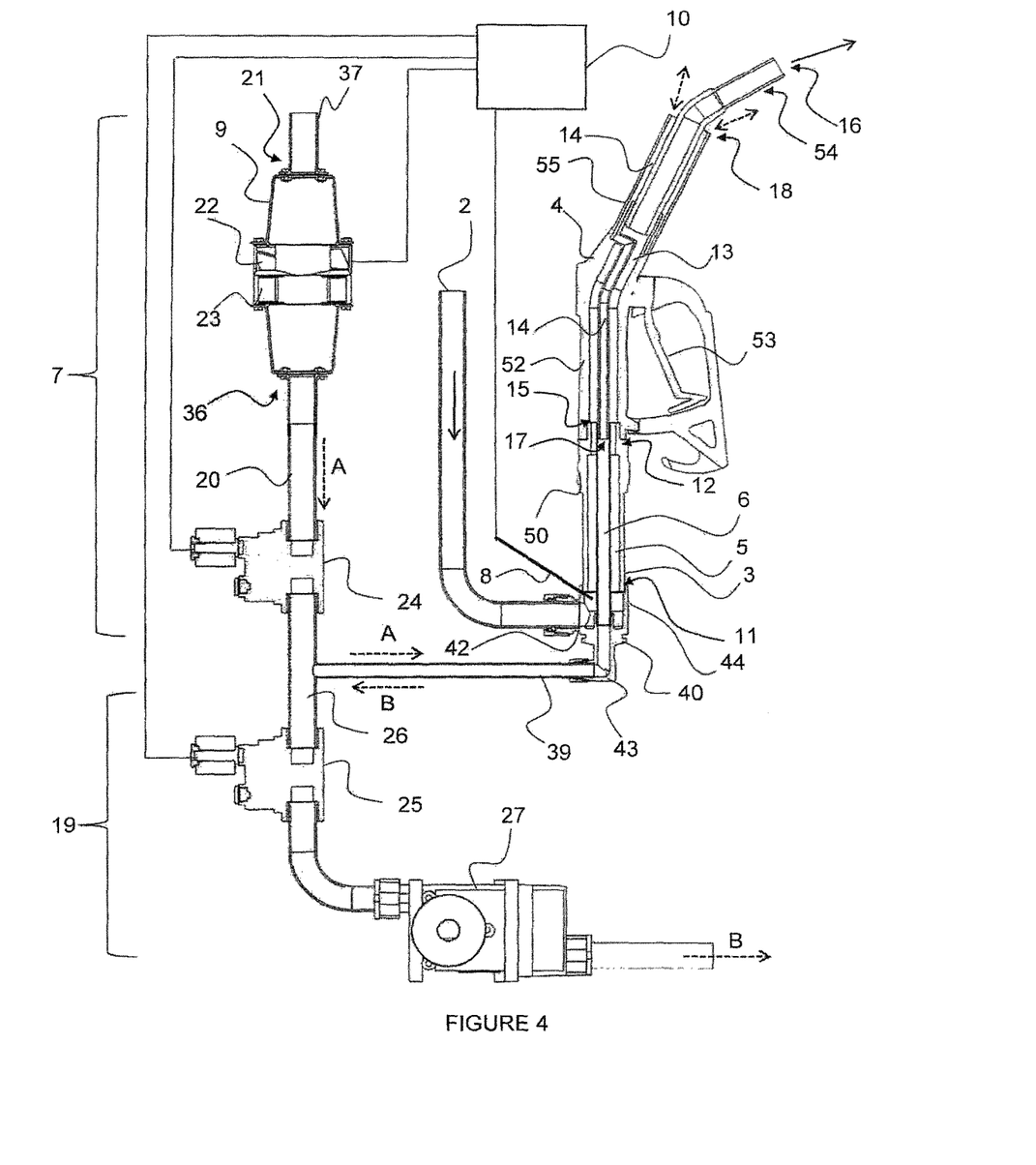
FIG. 4 is a sectional view schematically representing the heating system, the vapour recovery system, the liquid distribution circuit, the flexible pipe and nozzle.

As shown in FIG. 4, the flexible pipe 3 has two conduits 5, 6 including a first conduit 5 for the transfer of liquid from the liquid dispensing circuit 2 to the nozzle 4 during the delivery of liquid to the tank of the vehicle and a second conduit 6 extending along the first conduit 5. Preferably, the second conduit 6 extends over the entire length of the first conduit 5.

FIG. 4 shows a flexible pipe 3 which appears to be short compared to nozzle 4 in order to simplify the representation. In reality, the flexible pipe 3 is much longer, at least 2 m, for instance.

The liquid dispenser includes a heating system 7 for generating a flow of hot air through the second conduit 6 of the flexible pipe 4 to heat the liquid inside the first conduit 5 of the flexible pipe 3.

The first conduit 5 of the flexible pipe 3 has a diameter of 40 mm and the second conduit 6 of the flexible pipe 4 has a diameter of 10 mm, for instance. Other diameters are possible as long as hot air is allowed to circulate along the flexible pipe.

Figure 5:
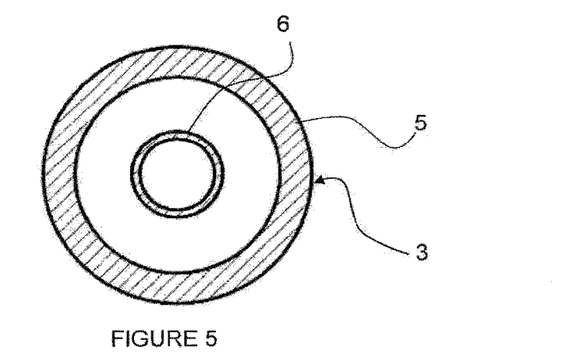
FIG. 5 represents a sectional view of the flexible pipe in which the first and second conduits are coaxial.

FIGS. 4 and 5 represent a possible embodiment in which the first conduit 5 and second conduit 6 are more or less coaxial. In the example of FIGS. 4 and 5, the second conduit 6 that is associated with the hot air transfer is placed inside the first conduit 5 that is intended for the transfer of liquid to form an annular liquid passage between the two conduits.

Alternatively, the two conduits 5, 6 can be inverted. The first conduit 5 for the liquid can be arranged inside the second hot air conduit 6.

The fact that they are "more or less coaxial" means that the first conduit 5 and the second conduit 6 can be exactly coaxial when the respective central axes of the conduits are one and the same and also not exactly coaxial when the central axes of the conduits are offset.

As shown in FIG. 4, the heating system 7 includes a temperature sensor 8 measuring the temperature T of the liquid and a control device 10 activating the heating means 9 when the temperature sensor 8 has detected a temperature T less than or equal to a critical temperature Tc. The critical temperature Tc is greater than −7° C. It is preferably −5° C. corresponding to the temperature from which the AdBlue® begins to crystallize.

The temperature sensor 8 can be arranged on the connector of flexible pipe 40 for instance, and be in contact with the liquid or not. Preferably, it is in contact with the liquid.

Other positions are possible for temperature sensor 8 which can be arranged in the fluid distribution circuit 2.

As shown in FIG. 3, the heating means 9 is placed inside an electronic compartment 29 which is a non-explosive zone. The advantage is that there is no need to use a heating means 9 corresponding to the ATEX 94/9/CE directives concerning explosive atmospheres.

Alternatively, the heating means 9 can be arranged in hydraulic compartment 28 or in the flexible hose storage compartment 31. The heating means 9 can also be arranged outside the liquid dispenser 1, near it, or at a distance from it. The heating means 9 can also be shared by several liquid dispensers 1.

Figure 7:
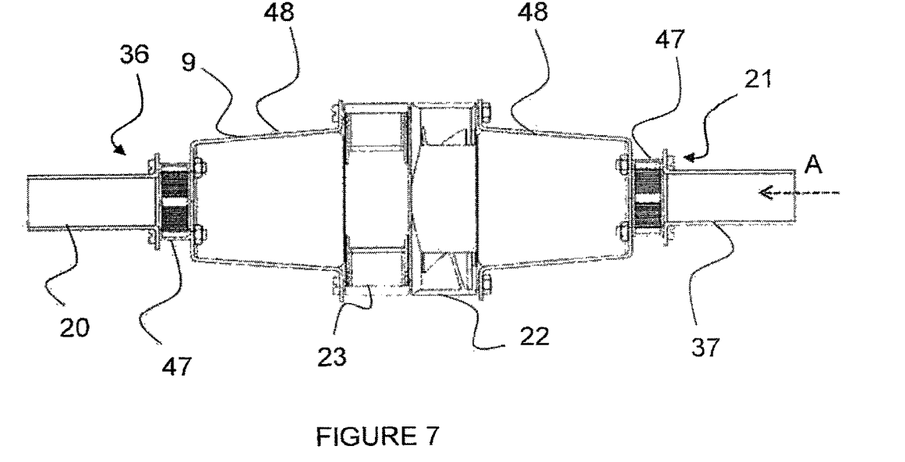
FIG. 7 represents a particular embodiment in which the heating means includes two flame deflectors.

The heating means 9 has an outlet 36 which is connected to the second conduit 6 of the flexible pipe by means of a hot air circuit 20. The heating means 9 has a cool air inlet 21 connected to the outside of the dispenser by an upper conduit 13, a fan 22 for drawing in cool air, and a heating element 23 heating the cool air to produce the flow of hot air, as shown in FIGS. 4 and 7. The heating means 9 generates a flow of pressurized hot air in the second conduit 6. The cool air is drawn in from outside the electronic compartment 29 to avoid a negative pressure forming inside it, since it is water and dust tight. The heating element 23 The heating element 23 is a heating is a heating resistor. The heating means 9 includes two deflectors 48 for channelling the air. The hot air circuit 20 may include pipes having a diameter included between 20 mm and 60 mm, and preferably of 40 mm.

FIG. 7 represents a special embodiment in which the heating means 9 includes a flame guard 47 at the inlet 21 and a flame guard 47 at the outlet, to stop any flames coming from the flexible pipe 3. These flame guards 47 are particularly useful when the liquid dispensing 1 based on AdBlue® is incorporated into a multi-product dispenser comprising a module supplying unleaded petrol. Fuel vapours are liable to be released during the distribution of petrol. If the vapours are drawn into the heating means 9, there is a risk of explosion. The fuel vapours entering into the heating means 9 liable to ignite. The flame guards 47 eliminate this risk by stopping the propagation of the flame. Preferably, heating means nine includes a single flame guard 47 at the outlet.

The power of the heating means 9 is at least 250 W. It can be 2 kW, for instance. According to another embodiment, the heating means 9 can be a Canadian well device including a hot air piping section buried in the ground at a depth of at least one meter. In winter, the ground has a temperature which is generally higher than that of the ambient air. For instance, if the ground temperature is 6° C. and the air is at −7° C., this ground temperature is sufficient to heat the hot air pipe than the flexible pipe and the dispenser. A fan is provided for blowing the hot air.

The hot air circuit 20 extends from the heating means 92 hydraulic compartment 28, passing through a wall 30 which is tight with respect to the AdBlue® and petrol vapours, arranged between hydraulic 28 and electronic 29 compartments. For instance, this sealed wall 30 resisting the vapours and known as the vapour barrier, includes a plate pierced with holes and in which seals 41 of the stuffing box type are inserted, ensuring tightness around the hot air circuit resistor 20 and electric cables not shown, passing through sealed wall 30. Sealed wall 30 prevents the liquid vapours from rising from the hydraulic compartment 28 to the electronic compartment 29. It is defined according to standard EN13617.1. The sealed wall 30 of FIG. 3 forms a type 1 vapour barrier and must comply with a water and dust tight rating of at least IP 67 according to standard EN 60529. Other variants of the super barriers are also possible, such as vapour barriers of type II which comprise a ventilation zone.

Hydraulic compartment 28 is enclosed by heat insulated walls. The part of the hot air circuit 20 which passes through hydraulic compartment 29 heats this compartment by thermal radiation. As an alternative, a complementary radiator can be arranged if necessary in the hydraulic compartment 28 to heat the liquid distribution circuit 2. In FIG. 3, liquid dispenser 1 has two dispensing sides each associated with a meter, a flexible pipe and a nozzle. The hot air circuit 20 is connected to the inlet of a three-way connector 38 which shares out the hot air flow to the two sides of liquid dispenser 1. Each of the two outlets of the three-way connector 38 is connected to an air/vapour conduit 39 connected to a flexible pipe connector 40. The flexible pipe connector 40 is shown in detail in FIG. 6. It has three channels including one liquid inlet 42 connected to the liquid dispensing circuit 2, a hot air inlet 43, connected to the air/vapour conduit 39 and an air/liquid outlet 44 connected to flexible pipe 3. Flexible pipe connector 40 includes a liquid path 45 connecting the liquid dispensing circuit 2 inside the first conduit 5 of the flexible pipe and a hot air path 46 connecting the air/vapour conduit 39 to the second conduit 6 of the flexible pipe. These two paths 45, 46 or channels, are arranged to be tight with respect to one another.

Figure 6:
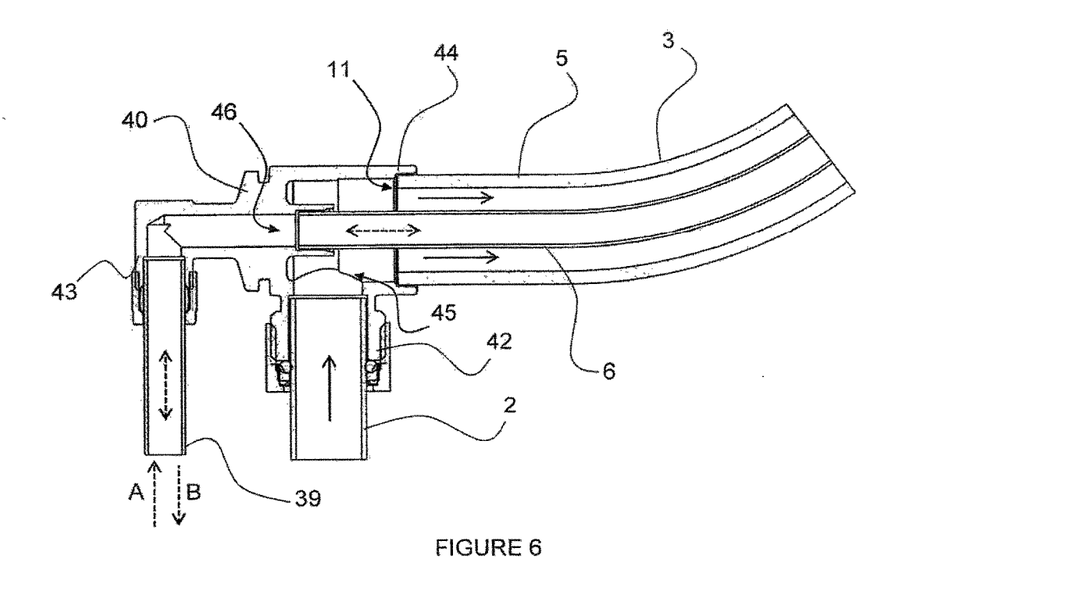
FIG. 6 represents a sectional view of a flexible connector.

Alternatively, the inlet of liquid 42 and the hot air inlet 43 of the flexible pipe connector 40 can be inverted in the case of the first conduit 5 of the flexible pipe being inside the second conduit 6 of the flexible pipe.

According to one possible embodiment, the second conduit 6 intended for the flow of hot air encloses the first conduit 5 intended for the transfer of the liquid. The second conduit 6 has a hot air inlet 11 having a fluidic connection to the heating system 7 and a hot air outlet upstream of nozzle 4 for the ejection of the hot air flow outside the second conduit 6 of the flexible pipe. In other words, the second conduit 6 opens out outside the flexible pipe 3 near the nozzle inlet.

Figure 10:
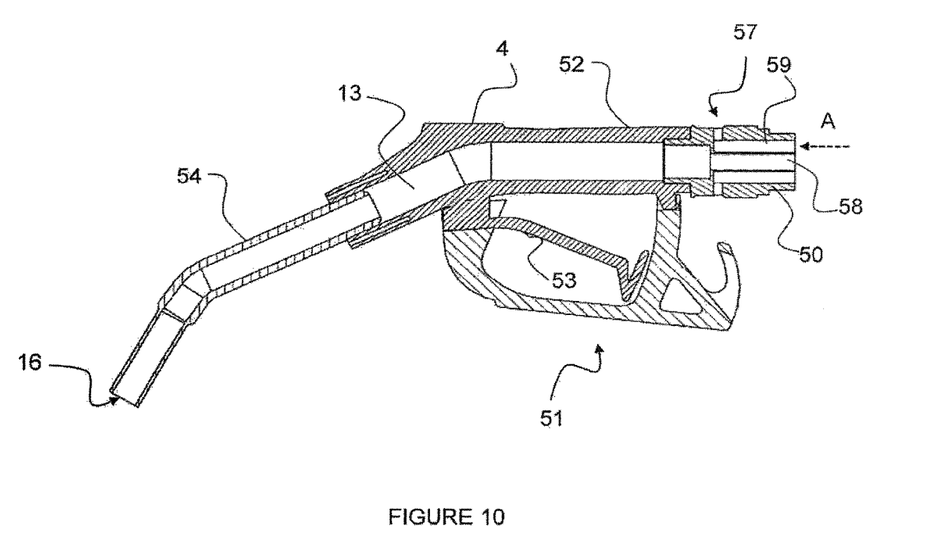
FIG. 10 is a sectional view of a nozzle according to a third embodiment.

As an alternative, and as a shown in FIG. 10, the union 50 connecting the nozzle 4 to the flexible pipe 3 comprises a first pipe 58 connected to the first conduit 5 of the flexible pipe 3 for the circulation of the liquid and a second pipe 59 connected to the second conduit 6 of the flexible pipe 3 for the circulation of the hot air. The hot air circulates in the second conduit 6 of the flexible pipe 3 in a direction A then in the second pipe 59 of union 50 and is expelled outwards to nozzle 4 through the hot air outlet 57 while part of the hot air flow heats the outside of the nozzle and part of the thermal energy is also transmitted to the nozzle by conduction through the connector connecting the flexible pipe 3 to the nozzle 4. The hot air outlet 57 of FIG. 10 is annular in shape. It can consist of a single orifice or a multitude of small orifices. The advantage of a hot air outlet 57 arranged on union 50 instead of flexible pipe 3 is that a flexible pipe conventionally designed for the recovery of fuel vapours can be used.

The hot air generated by heating means is transmitted into the hot air circuit 20 into the second conduit 6 of flexible pipe 3 which is inside the first conduit 5. The flow of hot air circulates over the entire length of the flexible pipe 3 to heat the liquid inside the first conduit 5 and as far as the inlet of the nozzle, preventing the crystallization of AdBlue® when the outside temperature is below −5° C.

According to one possible operating method of the liquid dispenser, the flow of air is generated continuously when nozzle 4 is hung on nozzle support 35 and during the operation of liquid distribution. In this embodiment, the generation of the hot air flow can be active when the critical temperature Tc is detected or continuously whatever the temperature of the fluid, while avoiding the use of a temperature sensor and a control system. For instance, the generation of the hot air can be activated automatically or manually at certain times of the year, when the weather is colder, and/or at the coldest times of the day.

Figure 8:
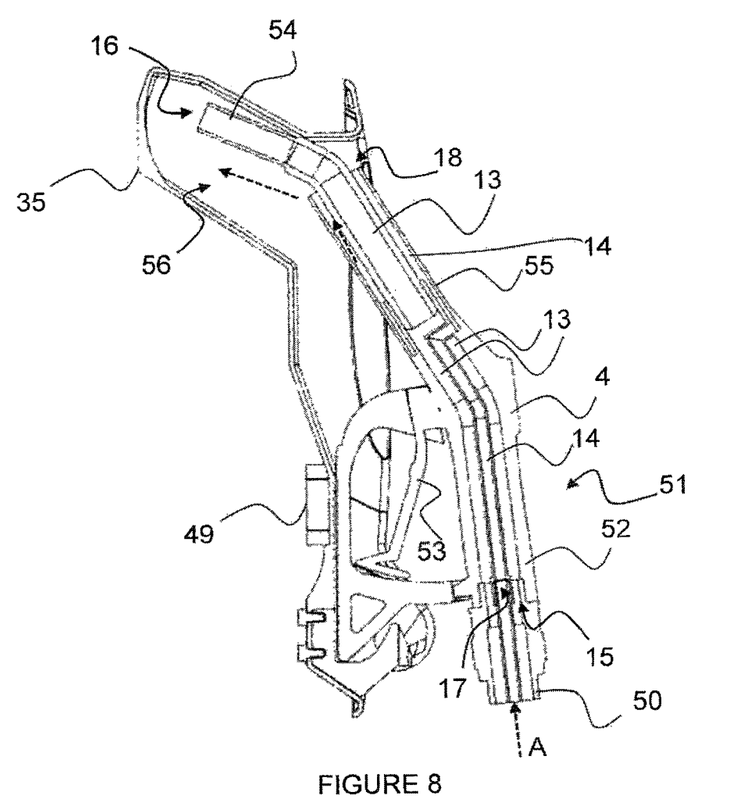
FIG. 8 is a sectional view of a nozzle hanging on the nozzle support according to a first possible embodiment.

According to one preferable operating method, the hot air is blown or pulsed into the second conduit 6 of the flexible pipe 3 by the heating means 9 when the liquid temperature T measured by a temperature sensor 8 is less than or equal to the setpoint temperature Tc. The control device 10 then activates the heating means 9. Preferably, the method includes a stage of detection of nozzle 4 on nozzle support 35, between the liquid dispensing stage and the hot air flow generation stage. The flow of hot air is generated if the presence of the nozzle 4 on the nozzle support 35 is detected by a detector 49 arranged on the nozzle support. As illustrated in FIG. 8, detector 49 can be, for instance, a magnetic sensor (e.g. a magnetic switch) detecting the presence of a magnet provided on the nozzle.

Accordingly, the flow of hot air is transmitted only when the nozzle 4 is hung up on nozzle support 35 and when the measured temperature T is less than or equal to the setpoint temperature Tc. A timeout can be provided between the detection of the hanging up of the nozzle 4 and the generation of the hot air flow for time t included between 1 s and 60 s. the temperature of the hot airflow is at least 5° C. in the second conduit 6 of the flexible pipe.

According to another alternative shown in FIGS. 4 and 8, the nozzle 4 is connected to the flexible pipe 3 by a union 50 and has a first pipe 13 including an inlet 15, connected to the first conduit 5 of the flexible pipe by a union 50 and an outlet 16 through which the liquid is dispensed.

Nozzle 4 has a second pipe 14 running along the first pipe 13 of the nozzle. The second pipe 14 has an inlet 17 connected to the second conduit 6 of the flexible pipe via a union 50 and an outlet 18 opening out upstream of outlet 16 of the first pipe 13 of the nozzle to expel the flow of hot air outside the second pipe 14 of the nozzle. The first pipe 13 and the second pipe 14 are coaxial.

In other words, the second conduit 6 of nozzle 4 opens outside of the flexible pipe near the outlet 16 of the nozzle. The hot air circulates through the second pipe 6 of the flexible pipe 3 in a direction A and is expelled toward the outlet 16 of the nozzle 4 so as to heat the liquid inside flexible pipe 3 and nozzle 4.

The hot air generated by heating means 9 is transmitted into the hot air circuit 20 in a direction A then into the second conduit 6 of flexible pipe 3 which is inside the first conduit 5. The flow of hot air circulates over the entire length of the flexible pipe 3 to heat the liquid inside the first conduit 5 and in the second pipe 14 of nozzle 4 as far as the outlet 18 of the second pipe 14, preventing the AdBlue® liquid from crystallizing both in the flexible pipe 3 and the nozzle 4.

The nozzle in FIG. 8 comprises a nozzle housing 51 with a grip 52 and a trigger 53 controlling the flow of fluid. The nozzle also includes a tip 54. In the body of the nozzle 51, the first pipe 15 of the nozzle 4 encloses the second pipe 14 of the nozzle. 4. From nozzle 54 on, it is the second pipe 14 that encloses the first pipe 13 of nozzle 4. The nozzle 54 is enclosed by a tubular collar 55 delimiting the second pipe 14 of nozzle 4. The collar 55 does not extend up to the outlet 16 of the first pipe 13 from nozzle 4.

The nozzle 4 is supported on a nozzle support 35 when it is hung up on the dispenser. The nozzle tip 54 is housed in a cavity 56. One part of the flow of air is expelled into this cavity 56 to optimize the heating of nozzle 4. The hot air circulates partially through cavity 56 to heat the tip 54.

As an alternative, nozzle support 35 has a cover or a fixed envelope in the upper part to cover the nozzle when it is in the nozzle support. This cover can be flexible or rigid and allows part of the flow of hot air to be maintained inside the cavity 56 and therefore isolate it.

As an alternative, the nozzle support has a hole for recovering the hot air in the cavity 56 which is connected to the hydraulic compartment by a pipe opening out into the hydraulic compartment to heat the hydraulic compartment by the flow of hot air. The orifice can be delimited by a collar rising as far as outlet 18 of the second pipe 14 of the nozzle so that the nozzle tip 54 is inserted into the collar when the nozzle is hung up. This limits the losses of air flow.

This type of nozzle is known because it is used in vapour recovery systems used in petrol dispensing. For the dispensing of the AdBlue® the nozzle is made of a material resisting the AdBlue®. Preferably, the nozzle is made of plastic.

Figure 9:
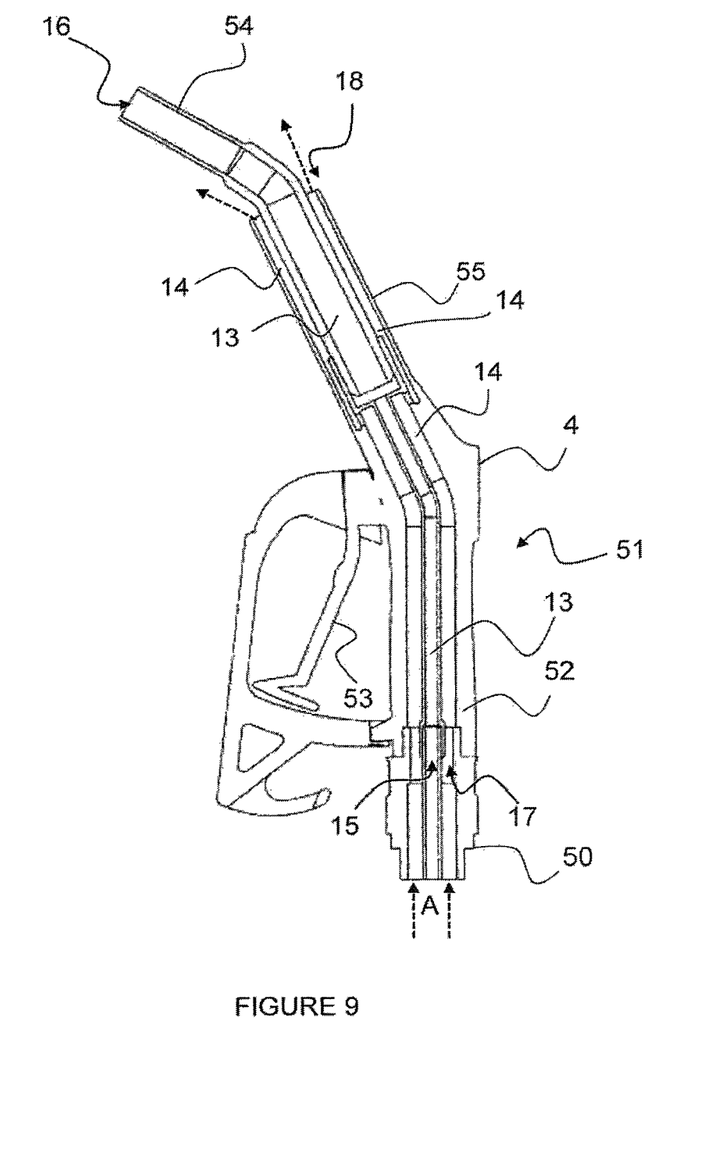
FIG. 9 is a sectional view of a nozzle according to a second possible embodiment.

FIG. 9 shows another variant of nozzle 4 in which pipes 13, 14 are inverted. Nozzle 4 comprises a first pipe 13 dedicated to the liquid containing an inlet 15 connected to the first conduit 5 of the flexible pipe and an outlet 16 via which the liquid is dispensed. The first conduit 5 of the flexible pipe in this case is inside the second conduit 6.

The nozzle 4 has a second pipe 14 running along the first pipe the 13 of the nozzle. The second pipe 14 has an inlet 17 connected to the second conduit 6 of the flexible pipe via a union 50 and an outlet 18 opening out upstream of outlet 16 of the first pipe 13 of the nozzle to expel the flow of hot air outside the second pipe 14 of the nozzle. The first pipe 13 and the second pipe 14 are coaxial.

In other words, the second conduit 14 opens outside of the flexible pipe near the outlet 16 of the nozzle. The hot air circulates through the second pipe 6 of the flexible pipe 3 in direction A and is expelled toward the outlet 16 of the nozzle 4 so as to heat the liquid inside flexible pipe 3 and nozzle 4.

The hot air generated by heating means 9 is transmitted into the hot air circuit 20 in a direction A then into the second pipe 6 of flexible pipe 3 which is inside the first conduit 5. The flow of hot air circulates over the entire length of the flexible pipe 3 to heat the liquid inside the first conduit 5 and in the second pipe 14 from nozzle 4 up to outlet 18 of the second pipe 14, preventing the AdBlue® from crystallizing both in the flexible pipe 3 and the nozzle 4.

According to the alternative of FIG. 9, the nozzle in FIG. 9 comprises a body provided with a grip 52 and a trigger 53 controlling the flow of fluid. In the body of the nozzle 51 and of the nozzle tip 54, the first pipe 13 of the nozzle 4 encloses the second pipe 14 of the nozzle 4. The nozzle 54 is enclosed by a tubular collar 55 delimiting the second pipe 14 of nozzle 4. The collar 55 does not extend up to the outlet 16 of the first pipe 13 from nozzle 4.

According to a preferable embodiment shown in FIG. 4, the liquid dispensing 1 comprises a vapour recovery system 19 designed to recover the vapours emitted by the liquid during its dispensing in the tank of the vehicle. The vapour recovery system 19 includes a vapour recovery circuit 26 connected on the one hand to a suction pump 27 and on the other hand to the second conduit 6 of the flexible pipe which is connected to the second pipe 14 of the nozzle. More specifically, the vapour recovery circuit 26 is connected to the air/vapour conduit 39 which is itself connected to the connector of the flexible pipe 40. The air/vapour conduit 39 is a common conduit through which the flow of hot air circulates in direction A when the heating system is active and through which the flow of vapour indrawn in direction B flows when the vapour recovery system 19 is active. Direction A is opposite to direction B.

As an alternative, air/vapour conduit 39 can be eliminated. The vapour recovery circuit 26 and the hot air circuit 20 can be connected directly to the connector of flexible pipe 40 which then includes four inlets/outlets including one liquid inlet, one hot air inlet, one vapour outlets and one liquid/air outlet.

Preferably, and as illustrated in FIG. 4, the heating system 7 comprises a first valve 24 to form the hot air circuit 20 when the vapour recovery system 19 is active and the vapour recovery system 19 includes a second valve 25 for closing the vapour recovery circuit 26 when the heating system 7 is active with the first valve 24 of the heating system 7 open.

The first valve 24 is placed between the heating means 9 and the air/vapour conduit 39. The second valve 25 is placed between the suction pump 27 and the air/vapour conduit 39.

The first valve 24 and the second valve 25 are valves controlled by the control device 10. The first valve 24 and the second valve 25 can be electric or pneumatic valves for instance. The first valve 24 and the second valve 25 can be preferably on-off solenoid valves or proportional valves.

Preferably, the outlet of the suction pump 27 is vented. Ammonia vapours are expelled directly into the air. The second valve 25 is then an on-off solenoid valve since there is no need to recover the ammonia vapours in the AdBlue® tank. Therefore, there is no need to use a proportional valve to adapt the flow of vapours drawn in to the flow of the AdBlue® thus provided.

As an alternative, it is possible to use a single three-way valve instead of two valves. The three-way valve includes a hot air inlet connected to the hot air circuit which can be open or closed, a vapour outlet connected to the vapour recovery circuit which can be open or closed and a hot air inlet/vapour outlet connected to a flexible pipe.

The invention also concerns a method implemented during the operation of a liquid dispenser as defined previously.

When the user unhooks the nozzle 4 from the nozzle support 35 to fill the tank of his vehicle with AdBlue®, the position detector 49 detects the unhooking and sends information to the control device 10. The latter sends a signal to the first valve 24 to initiate its closing and a signal to the second valve 25 to initiate its opening. Control device 10 also sends a signal to the heating means 9 to stop it if it is active and a signal to the suction pump 27 to activate it so as to draw in the ammonia vapours released during the dispensing of AdBlue®.

The ammonia vapours are therefore indrawn in direction B of nozzle 4 towards the suction pump 27. As shown in the FIG. 4, the ammonia vapours are drawn into the collar 55 of nozzle tip 54 of the nozzle through the outlet 18 of the second pipe 14 of the nozzle. The ammonia vapours then pass through the second pipe 14 of the nozzle 54 as far as the body of nozzle 51 in which the second pipe 14 is inside and at the centre of the first pipe 13 of the nozzle.

The ammonia vapours pass through the union 50 then the second conduit 6 of the flexible pipe 4 which has a fluidic connection to the second pipe 14 of the nozzle. The second conduit 6 is inside and at the centre of the first conduit 5 of the flexible pipe 3.

The ammonia vapours pass through the connector of the flexible pipe 40, the air/vapour conduit 39, the vapour recovery circuit 26, then the vapour recovery pump 27. The ammonia vapours are expelled directly into the air.

As an alternative, it may be arranged to recover the ammonia vapours in order to return them to the AdBlue® tank.

When the user has finished filling the AdBlue® tank of his vehicle, the distribution of the fluid stops and he hangs up the nozzle 4 on the nozzle support 35. The detector 49 detects the presence of the nozzle 4 and sends a signal to the control device 10 which transmits a signal to the suction pump 27 to stop it, and a signal to the second valve 25 to activate its closing.

Preferably, a time delay allows the closing time of the second valve 25 and the stoppage of the suction pump 27 to be delayed for a time t. The time t is included between 1 second and 1 minute; preferably it is 5 seconds.

This time delay ensures that all the ammonia vapours have been drawn off into the nozzle 4, the flexible pipe 3 and the air/vapour conduit 39 before the hot air is allowed in.

After the second valve 25 closes and the suction pump 27 stops, when the temperature sensor 8 detects a temperature of less than −5° C., the control device 10 transmits a signal to the first valve 24 of the heating circuit to open it and a signal to heating means 9 to activate it so that cool air is drawn in from a non-dangerous zone outside the AdBlue® dispenser by the fan 22 of the heating means 9 and is heated by the heating element 23, producing a flow of hot air under pressure through the hot air circuit 20 in direction A. The flow of hot air then passes through the air/vapour conduit 39, the flexible pipe connector 40, the second conduit 6 of flexible pipe 4, the second pipe 14 of the nozzle, to exhaust into the open air via outlet 18.

The flow of hot air thus heats the AdBlue®, when the distribution is at a stop, in the first conduit 5 of flexible pipe 3 and in the first pipe 13 of nozzle 4, preventing the AdBlue® from crystallizing.

In one particular embodiment concerning a multi-product dispenser comprising a urea-based liquid dispensing module and at least one fuel dispensing module, the flow of hot air is stopped when a fuel dispensing module supplies fuel, to optimize safety and avoid risks of explosion.

The above method also applies to the embodiment of FIG. 9 in which the second pipe 14 of the nozzle and closes the first pipe 13 of the nozzle and in which the second conduit 6 of the flexible pipe 4 encloses the first conduit 5 of the flexible pipe 4.

The invention claimed is:

1. A liquid dispenser for vehicles comprising:
    a liquid dispensing circuit connected to a liquid tank and to a flexible pipe, the flexible pipe connected to a nozzle configured to dispense the liquid in a tank of the vehicle, the flexible pipe comprising two conduits, more or less coaxial, of which a first conduit transfers liquid from the liquid dispensing circuit to the nozzle during the delivery of liquid to the tank of the vehicle and a second conduit extends along the first conduit; and
    a heating system designed to generate a flow of hot air through the second conduit of the flexible pipe to heat the liquid inside the first conduit of the flexible pipe, wherein the nozzle comprises:
    a first pipe comprising an inlet connected to the first conduit of the flexible pipe and an outlet via which the liquid is dispensed, and
    a second pipe running along the first pipe of the nozzle and having an inlet connected to the second conduit of the flexible pipe and an outlet opening out upstream of the outlet of the first pipe of the nozzle in order to expel the flow of hot air outside the second pipe of the nozzle.

2. The liquid dispenser according to claim 1, further comprising a vapour recovery system configured to recover vapours emitted by the liquid when it is dispensed in the vehicle tank, the vapour recovery system comprising a vapour recovery circuit connected to an intake pump and to the second conduit of the flexible pipe which is connected to the second pipe of the nozzle.

3. The liquid dispenser according to claim 2, wherein:
    the heating system includes a means of heating connected to the second conduit of the flexible pipe by means of a hot air circuit and a first valve to close the hot air circuit when the vapour recovery system is active;

the vapour recovery system includes a second valve for closing the vapour recovery circuit when the heating system is active with the heating system valve open.

4. A liquid dispenser for vehicles comprising:
a liquid dispensing circuit connected to a liquid tank and to a flexible pipe, the flexible pipe connected to a nozzle configured to dispense the liquid in a tank of the vehicle, the flexible pipe comprising two conduits, more or less coaxial, of which a first conduit transfers liquid from the liquid dispensing circuit to the nozzle during the delivery of liquid to the tank of the vehicle and a second conduit extends along the first conduit; and
a heating system designed to generate a flow of hot air through the second conduit of the flexible pipe to heat the liquid inside the first conduit of the flexible pipe, wherein the liquid dispenser further comprises a hydraulic compartment housing the liquid dispensing circuit, and an electronic compartment adjacent to the hydraulic compartment and in which the heating means is housed with the hot air circuit extending from the heating means as far as the hydraulic compartment, passing through a vapour-tight wall arranged between the hydraulic and electronic compartments.

5. The liquid dispenser according to the claim 1, wherein the second conduit of the flexible pipe intended for the hot air flow encloses the first conduit intended for the transfer of the liquid and comprises a hot air inlet with fluidic connection to the heating system, the second conduit or a union connects the flexible pipe to the nozzle comprising a hot air outlet downstream of the nozzle to expel the flow of hot air outside the flexible pipe.

6. A method implemented during the operation of a liquid dispenser comprising:
a liquid dispensing circuit connected to a liquid tank and to a flexible pipe connected to a nozzle allowing liquid to be dispensed to the tank of a vehicle and to a heating system for this liquid by means of hot air comprising a hot air circuit connected to the flexible pipe, with this flexible pipe comprising two conduits, more or less coaxial, comprising a first conduit connected to the liquid dispensing circuit and a second conduit connected to the hot air circuit, and
a vapour recovery system configured to recover the vapours by the liquid when it is dispensed in the vehicle tank comprising a vapour recovery circuit connected to the second conduit of the flexible pipe and to a first valve connected to the hot air circuit allowing the hot air circuit to be closed, and to a second valve connected to the vapour recovery circuit allowing the vapour recovery circuit to be closed,
wherein the method comprises:
measuring the temperature (T) of the liquid;
detecting the hanging up of the nozzle on the liquid dispenser after a filling operation;
if the temperature (T) is less than or equal to a setpoint temperature (TC), ordering the circulation of a flow of hot air through the hot air circuit and in the second conduit of the flexible pipe, in a first direction (A) until the nozzle unhooked;
detecting the unhooking of the nozzle (4) indicating the beginning of a vehicle tank filling operation;
closing the first valve and opening the second valve to allow the recovery of the vapours emitted during this filling operation;
detecting the hanging up of the nozzle (4) on the liquid dispenser indicating the completion of this filling operation; and
closing the second valve and opening the first valve to allow the ordering of the circulation of a hot air flow through the air circuit if the liquid temperature (T) is less than or equal to the setpoint temperature (TC).

7. The method according to claim 6, wherein the closing of the second valve and the stoppage of the vapour recovery operation, after detecting that the nozzle has been hung up on the liquid dispenser, take place only after a time delay lasting time t.

* * * * *